Sept. 8, 1970  M. ORAIN  3,526,950

METHOD OF ASSEMBLING ELEMENTS

Filed April 22, 1968  3 Sheets-Sheet 1

Inventor:
Michel Orain
BY Baldwin Wight Diller & Brown
Attorneys

Sept. 8, 1970  M. ORAIN  3,526,950
METHOD OF ASSEMBLING ELEMENTS
Filed April 22, 1968  3 Sheets-Sheet 2

Inventors:
Michel Orain
By Baldwin Wight Diller & Brown
Attorneys

Sept. 8, 1970  M. ORAIN  3,526,950

METHOD OF ASSEMBLING ELEMENTS

Filed April 22, 1968  3 Sheets-Sheet 3

Inventor:
Michel Orain
By Baldwin Wight Miller & Brown
Attorneys

United States Patent Office 3,526,950
Patented Sept. 8, 1970

1

3,526,950
METHOD OF ASSEMBLING ELEMENTS
Michel Orain, Courbevoie, France, assignor to Societe Anonyme Glaenzer Spicer, Poissy, France, a corporation of France
Filed Apr. 22, 1968, Ser. No. 722,856
Claims priority, application France, Apr. 28, 1967, 104,730
Int. Cl. B23p *11/00*
U.S. Cl. 29—434                                     5 Claims

ABSTRACT OF THE DISCLOSURE

In order to assemble a mechanical part having external spindles with an enclosing part of circular cross section, a cylindrical recess is stamped at the end of each of said spindles, coaxially with the same, cylindrical studs in a member corresponding to said spindles and having a diameter slightly less than that of said recesses are stamped in the inner surface of the enclosing part, together with annular grooves surrounding said studs, the enclosing part is radially deformed to give it a polygonal section enabling the part with the spindles to be introduced therein with the recesses in the spindles engaged over said studs, said enclosing part being thereafter restored to its cylindrical shape.

---

The present invention relates to a method of assembling a part having external spindles and a circular enclosing part. It also relates to apparatus used for carrying out said method, and assembles produced by the method.

Such parts in the past have generally been assembled by means of intermediate connecting parts, which increases the size of the assembly thus formed, impairs its appearance, and increases its cost. In addition, this type of assembly always shows signs of weakness and there is a risk of play occurring between the assembled parts.

The present invention seeks to provide a method of assembling a part having external spindles and a circular enclosing part having the following advantages:

It is simple, because it needs no connecting part in addition to the parts to be joined together, it provides a good connection between the two parts without giving rise to any play, and the application of alternating torques does not result in backlash.

Furthermore, the construction makes it possible to reduce the size of the assembly, because after the two parts have been assembled nothing projects from them; thus the assembly has a neat appearance.

The strength of the joint between the two parts does not limit the strength of each separate part; in other words, the joint does not produce any weakening. Moreover, while they are firmly connected together, the two parts are not fragile in the region of the connection and may undergo deformation due to working stresses without impairing the safety of the joint which has been made.

This method makes it possible to join to a tubular part a part having one or more spindles possessing excellent characteristics of mechanical precision, without reducing these characteristics.

Moreover, the method makes it possible to retain the tightness of the enclosing part (bowl or tubular part), which constitutes a great advantage over known methods commonly adopted, which necessitate the drilling of the wall of said part when the latter has to contain and retain a lubricant.

Finally, the method is economical, because it needs only the use of an extremely simple tool.

2

According to the present invention a method of assembling a part having external spindles and a circular enclosing part, consists in forming, at the end of each of the arms or spindles of the part to be fixed in an enclosing cylindrical part, a cylindrical recess coaxial with the arm of spindle; stamping internally in the cylindrical wall of the enclosing part, which has an inside diameter slightly greater than the diameter which it has actually to assume after final assembly, a number of cylindrical studs equal to the number of spindles provided on the part to be fixed, each of said studs being surrounded by an annular groove and having an outside diameter slightly greater than the inside diameter of the recesses in the spindles and the outside diameter of each annular groove being slightly smaller than the outside diameter of the end of each spindle; radially deforming the tubular portion of the enclosing part in order to give it a polygonal section enabling the part to be fixed to be introduced into it in such a manner that the cylindrical recesses in its spindles make a force fit with the studs of the enclosing part; and finally, restoring the latter to a perfectly cylindrical form with a slight reduction of mean diameter by passing it, under the action of a press through a tool having a conical throat.

The part to be fixed may advantageously be introduced into the enclosing part by successively engaging the spindles on the studs and in the annular grooves around the latter, one after the other.

In order to give a perfectly cylindrical form to the outer edge of the annular groove surrounding each of the studs on the enclosing part, the cylindrical portion of the latter may be hooped during the stamping and the peripheral zone of said groove pressed with the aid of a stamping tool provided with a shoulder producing a circular flat around the groove.

Also according to the present invention, apparatus for carrying out the method explained above comprises on the one hand a stamping tool consisting of three elements, each having a central bore surounded by an annular rib, optionally surrounded by a flat shoulder, which elements are capable of producing respectively in the wall of the enclosing part a stud, an annular groove, and optionally a flat peripheral zone, and on the other hand a die provided with a conical throat followed by a cylindrical portion the diameter of which is equal to the outside diameter which the enclosing part assembled to the part to be fixed is to have.

Also according to the present invention, we provide assemblies formed of parts equipped with spindles and parts having a cylindrical tubular portion, which are connected together by the method described above.

An example of the method of the present invention, as applied to a part provided with three spindles which is to be fixed in a bowl terminating a wheel stub axle, is now described with reference to the accompanying drawings, in which.

Figure 1:
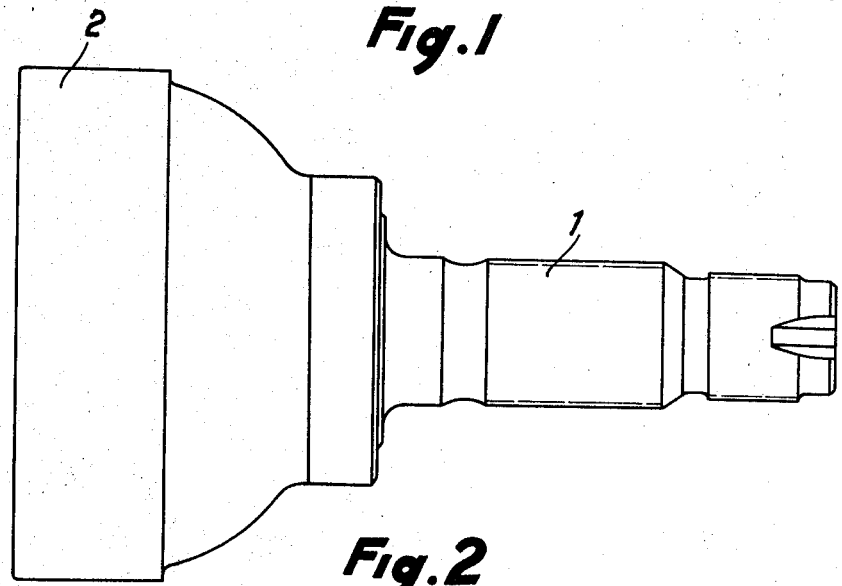
FIG. 1 illustrates in elevation a wheel stub axle provided with a bowl.
Figure 2:
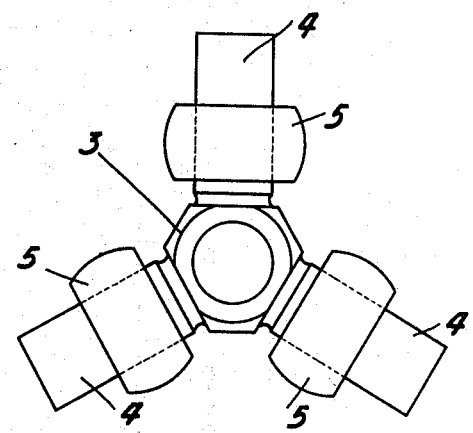
FIG. 2 shows an end view of a drive part provided with three spindles.

Referring to the drawings, there is shown a wheel stub axle 1 (FIG. 1) having a cylindrical bowl-shaped portion 2 and adapted to be rotationally driven by means of a part or tripod 3 (FIG. 2) forming part of a transmission joint and provided with arms 4 serving as spindles for rollers 5. For this purpose, the tripod 3 must be fixed very firmly inside the bowl 2, or more precisely, in the bore 6 of its cylindrical wall portion, without projecting outside the bowl, and the assembly must be strong, have no play, and be sealed after the two parts have been joined together as illustrated in FIGS. 3 and 4.

For this purpose, the bore 6 (FIG. 6) of the bowl undergoes three stamping operations, carried out with the aid of a triple tool, each stamping providing a central cylindrical stud 7 surrounded by an annular groove 8 concentric with the stud.

Figure 3:
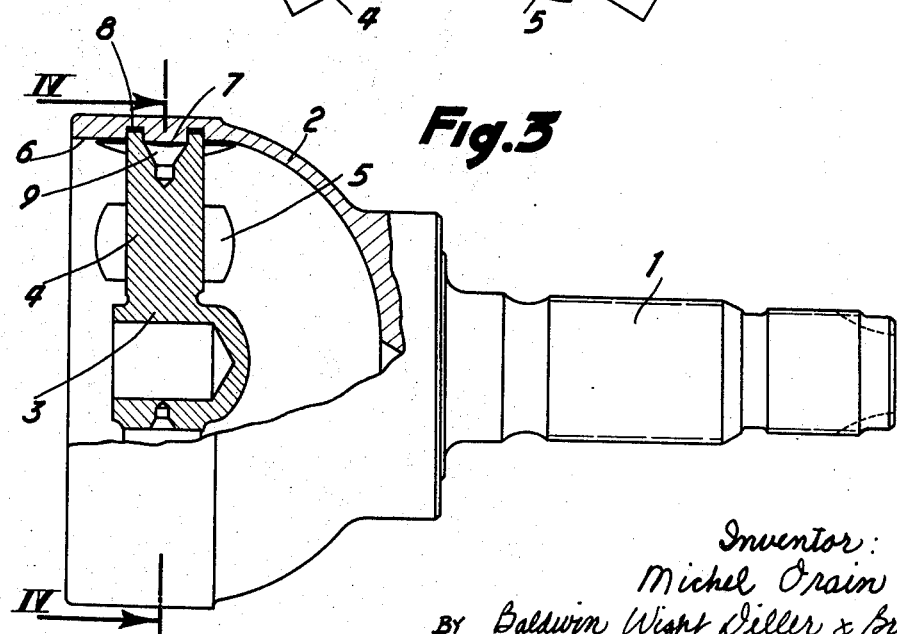
FIG. 3 shows, partly in section, the assembly formed by the two aforesaid parts after being joined together.
Figure 4:
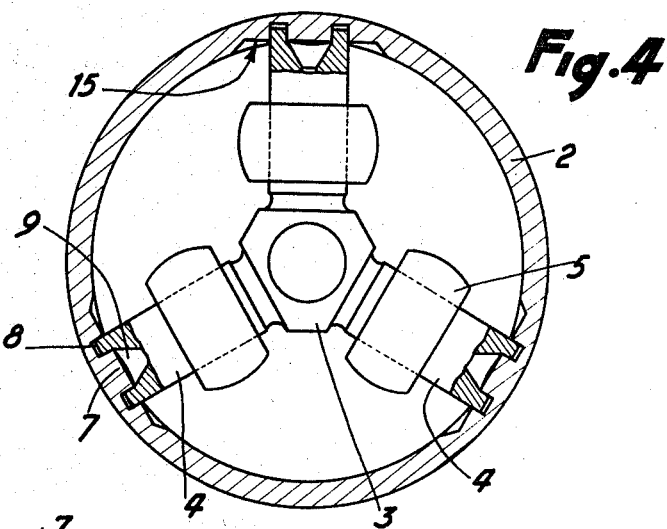
FIG. 4 is a section along the line IV—IV in FIG. 3.
Figure 5:
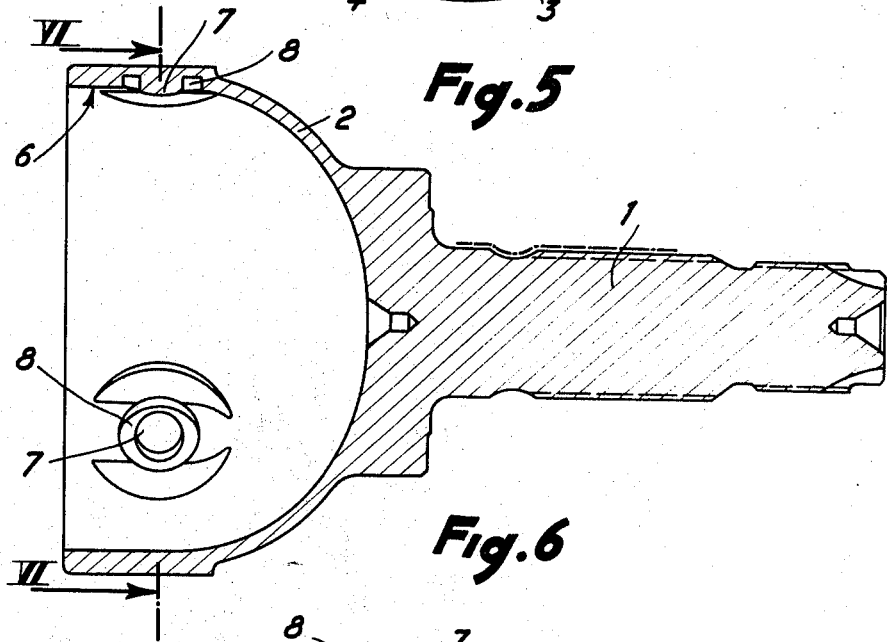
FIG. 5 shows the wheel stub axle in longitudinal section after a first phase of the method.

At the end of each of the spindles 4 of the tripod 3 there is formed a cavity 9 comprising a cylindrical portion and a conical portion (FIGS. 3 and 4). The cylindrical portion of the cavity 9 has a diameter slightly smaller than the outside diameter of the stud 7, while the outside diameter of the spindles 4 is slightly larger than the diameter of the bore 11 of the annular groove 8. It will be understood that in these circumstances it would be impossible to introduce the tripod 3 into the bowl 2 without deforming the bowl, because the outside diameter of the tripod 3 is greater than the diameter of the circle inscribed between the studs 7.

Figure 8:
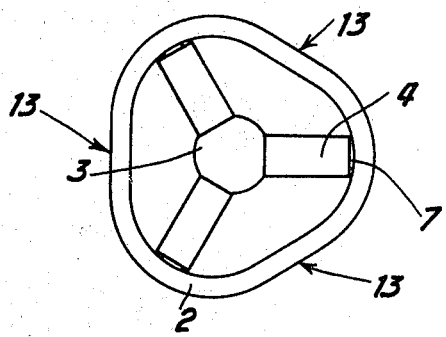
FIG. 8 illustrates diagrammatically the shape given to the assembly after introduction of the part provided with spindles into the bowl of the stub axle.
Figure 9:
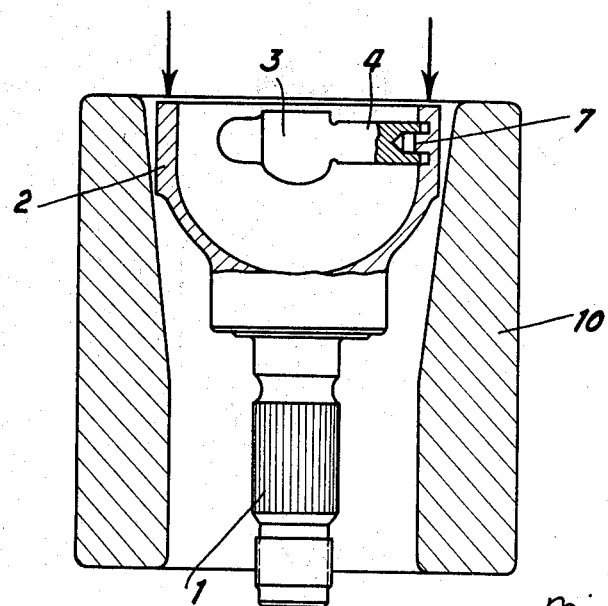
FIG. 9 shows in section the bowl shaping die in the last phase of the method.

The fitting of the tripod 3 inside the bowl 2 is made possible by respecting three conditions which are applied jointly or separately in such a manner as to result in minimum plastic deformation during assembly:

(1) The bowl must have an inside diameter larger than the diameter which it will actually have after final assembly; this final diameter is obtained by passing the bowl 2 into a die 10 (FIG. 9), the tripod 3 being previously placed in position in the bowl;

(2) The bowl or tubular portion 2 originally of cylindrical shape, which is more convenient for machining or drawing, undergoes triple stamping which profiles the studs 7 and the grooves 8 which are to receive the ends of the spindles of the tripod. This bowl is then triangulated or deformed radially into a polygonal section having three zones 13 distributed angularly at 120° over its contour so that the tripod 3 can be locally introduced into the bowl at points corresponding to the studs 7 (FIG. 8);

(3) The tripod must be positioned over the studs 7 spindle by spindle, one after the other, if it is desired to reduce to the minimum the deformations indicated above in (1) and (2).

After introduction of the tripod 3, the bowl or tubular portion 2 is drawn, as previously stated, in a conical throat 10 (FIG. 9) which makes the bowl perfectly cylindrical again, with a slight reduction of mean diameter.

There is thus obtained (FIGS. 3 and 4) an assembly of great strength, without apparent means of fastening.

The fastening of the ends of the tripod in the bowl has great strength because:

(1) The surfaces subjected to hammering are large. In addition to the outer surface of the arms 4 of the tripod being held captive in the annular groove 8, there is also the cylindrical surface of the stud which is held captive in the bore 9 of each of said arms.

(2) The engagement is tight and therefore the assembly is prestressed.

Figure 7:
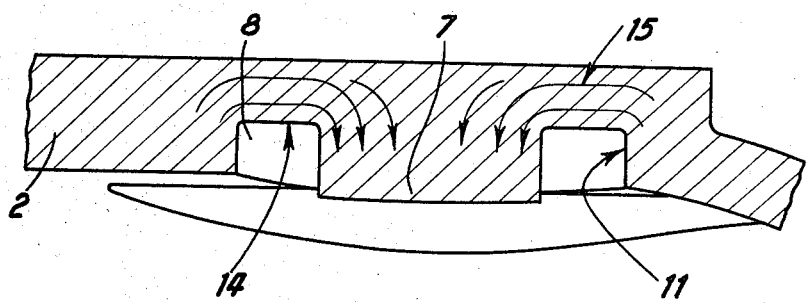
FIG. 7 is a partial section on a larger scale of the bowl of the stub axle, at the position of a spindle fastening stud.

(3) The stud 7 (FIG. 7) is obtained by extrusion as a result of the pressure applied annularly by the tool. This results in the advantageous feature that the stud is fibred and that the metal is superficially strain hardened and is glazed.

All these characteristics are obviously favourable.

Figure 6:
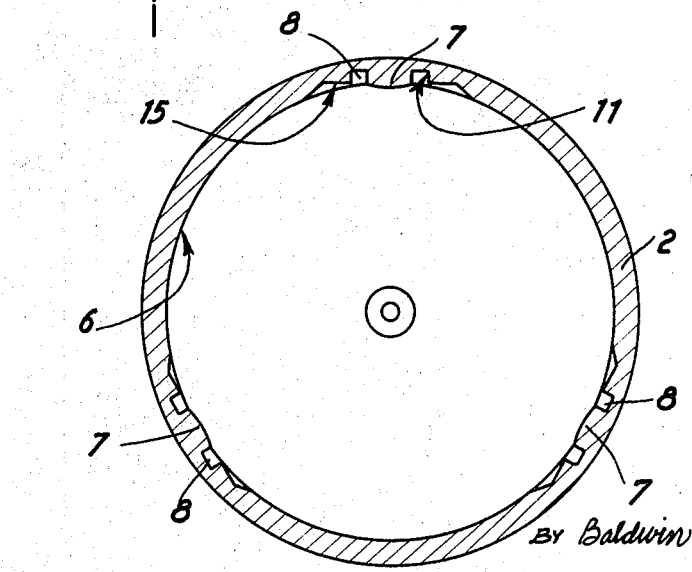
FIG. 6 is a section along the line VI—VI in FIG. 5.

The shape of the stamped profiles 7–8 (FIG. 7) in the bowl, 2, which constitutes one of the characteristics of the invention, not only has the advantage of forming a fastening of great strength through the presence of two concentric cylindrical bearing surfaces, but also has the advantage of being easily shaped by plastic transfer of metal. In fact, the hydrostatic thrust set up during the stamping on the bottom 14 of the annular cavity 8 obliges the metal to flow to the interior of the ring, thus forming the stud 7. At the same time this permits an evacuation of the metal situated in the ring before the operation and prevents the radial expansion of the compressed portion 15, which would have the effect of widening the bore 11 and making it unsuitable for its duty of hooping the end of the tripod. In order to obtain a perfectly symmetrical shape for this bore 11, it is in addition possible in an advantageous manner for the bowl to be hooped during the stamping of the shape 7–8 and to press the zone enclosing this shape with the aid of the actual stamping tool, by providing it with a shoulder. The result may form a flat 15 as illustrated in FIGS. 4 and 6.

What is claimed is:

1. A method of assembling a part having external spindles and an enclosing part of circular cross section and having a cylindrical wall, said method comprising forming, at the end of each of said spindles of said part to be fixed in said enclosing part, a circular recess coaxial with the respective spindle; stamping internally in the cylindrical wall of said enclosing part, which has an inside diameter slightly greater than the diameter which it has actually to assume after final assembly, a number of cylindrical studs equal to the number of spindles provided on said part to be fixed, each of said studs being surrounded by an annular groove and having an outside diameter slightly greater than the inside diameter of said recesses in said spindles and the outside diameter of each annular groove being slightly smaller than the outside diameter of the end of each spindle; radially deforming a tubular portion of said enclosing part in order to give it a polygonal section enabling said part to be fixed to be introduced into it in such a manner that said cylindrical recesses in its spindles make a force fit with said studs of said enclosing part; and finally restoring the latter to a perfectly cylindrical form with a slight reduction of mean diameter by passing it under the action of a press, through a tool having a conical throat.

2. A method according to claim 1, in which said part to be fixed is introduced into said enclosing part by successively engaging said spindles on said studs and in said annular grooves around the latter, one after the other.

3. A method according to claim 1, in which, in order to give a cylindrical form to the outer edge of said annular groove surrounding each of said studs on said enclosing part, said cylindrical portion of said enclosing part is hooped during said stamping and the peripheral zone of said groove is pressed with the aid of a stamping tool provided with a shoulder producing a circular flat around said groove.

4. Apparatus for assembling a part having external spindles and an enclosing part of circular cross section, comprising a stamping tool consisting of three elements, each having a central bore surrounded by an annular rib, which elements are capable of producing respectively in the wall of said enclosing part a stud and an annular groove, and a die provided with a conical throat followed by a cylindrical portion, the diameter of which is equal to the outside diameter which said enclosing part assembled to said part to be fixed is to have.

5. Apparatus according to claim 4, in which each annular rib is surrounded by a flat shoulder to provide a flat peripheral zone around said groove.

(References on following page)

References Cited

UNITED STATES PATENTS

| | | | |
|---|---|---|---|
| 2,213,448 | 9/1940 | Morton | 29—438 |
| 2,238,335 | 4/1941 | MacGregor | 64—17 |
| 3,230,617 | 1/1966 | Spiess et al. | 29—434 |
| 3,302,267 | 2/1967 | Benson | 29—148.4 |
| 3,447,232 | 6/1969 | Stillwagon | 29—434 |

THOMAS H. EAGER, Primary Examiner

U.S. Cl. X.R.

29—149.5